Oct. 16, 1956
V. DEL-BUONO
2,766,736
ELECTRIC ARC FURNACE, WATER COOLED, ROOF DOOR
Filed May 27, 1952
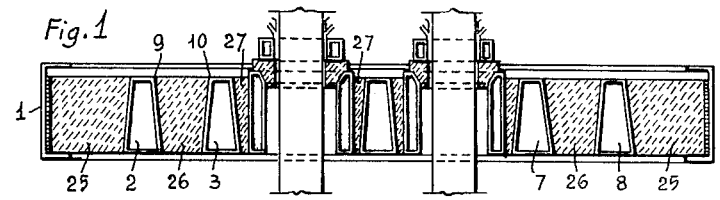
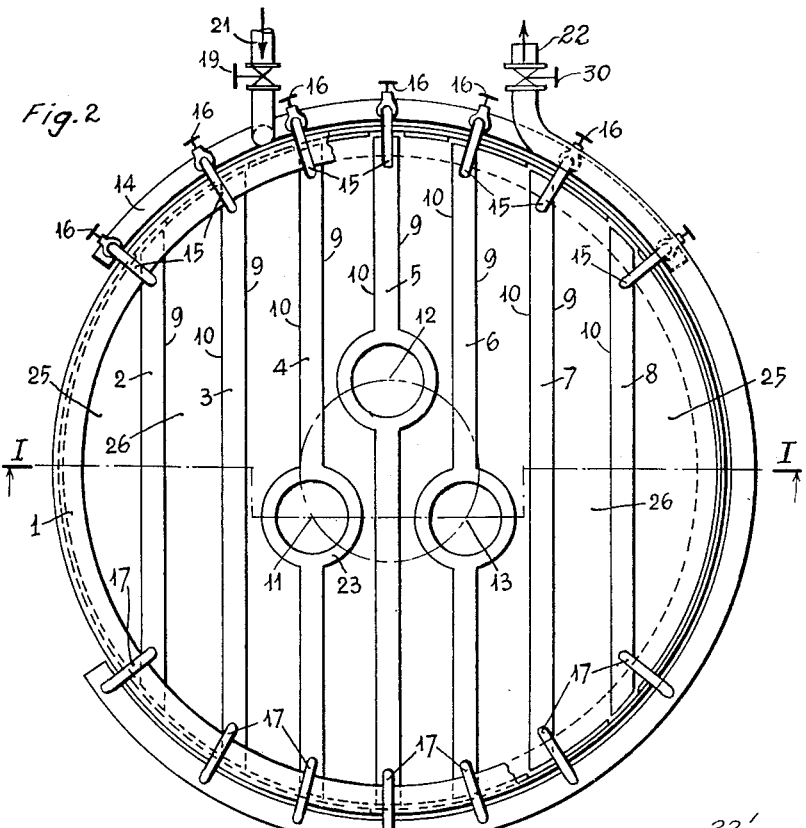
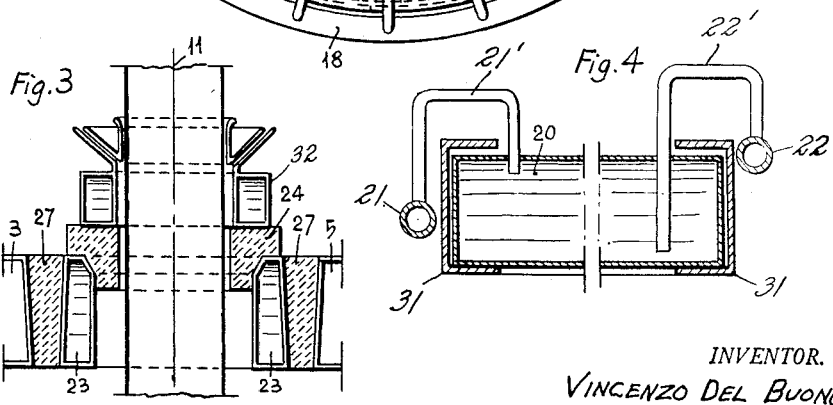
INVENTOR.
VINCENZO DEL BUONO
BY
*Robert E. Burns*
ATTORNEY

United States Patent Office 2,766,736
Patented Oct. 16, 1956

2,766,736

ELECTRIC ARC FURNACE, WATER COOLED, ROOF DOOR

Vincenzo Del Buono, Genoa, Italy, assignor to Celso Ciamberlini, Crema, Italy

Application May 27, 1952, Serial No. 290,240

Claims priority, application Italy June 9, 1951

5 Claims. (Cl. 122—498)

The roofs or lids of electric arc furnaces now in use are built with fire proof bricks, for instance with silico-aluminous or siliceous bricks in the shape of a domed cap through which the electrodes of the furnace pass. These roofs or lids usually are short-lived because the fire proof material which is continuously splattered by the oxides and slags becomes impregnated with matters which lower its melting temperature. Generally the life of a roof is between 80 and 150 tappings. It will thus be seen that the maintenance of the roof is very costly due to the necessity of supplying fire proof material as well as labor costs.

On the other hand, it should be noted that the yield or thermal balance of an electric arc furnace does not rely, as in a Martin furnace, on minimizing the heat loss or on maximum recovery of heat contained in the combustion and reaction gases. The Martin furnace does not permit the escape of flame. The flames, after having traveled through the chamber and eventually also the regenerators, reach the base of the chimney at a temperature of little more than 200° C. An electric arc furnace, on the contrary, permits a complete waste of the reaction gases and the roof constitutes a protecting lid for the electrode supports and leads.

A satisfactory thermal yield, that is a suitable transformation of kilowatt hours into heat, depends almost entirely on proper manipulation of the electrodes, which is obtained by means of an automatic controller. In fact, in an electric arc furnace, the melting of the slag is accomplished in the following manner. The electrode quickly perforates the mass of slag and reaches the bottom of the furnace where it begins the melting operation, thus obtaining a metal bath beneath a relatively cold blanket of slag. At this time, the melting is not in the least influenced by the roof. In other words, there is a phenomenon analogous to the one that occurs in the operation of a furnace for iron alloy or cast iron, which, as is well known, is a continuously operating roofless furnace. During the melting of the bath and during refining, the skillful steel operator is continuously attempting to obtain a hot steel bath utilizing a cold lining and a cold roof. The roof "drips" only when the furnace is improperly operated and in most of these cases cold steel is produced. Sometimes it is necessary to increase the energy consumption, consequently causing the dripping of the roof and impairment of the quality of the steel.

The present invention relates to a roof for an electric arc furnace which overcomes the aforesaid technical deficiencies, requires less fire proof material and increases the life of the roof without impairing the utility of the roof in connection with thermal balance of the furnace.

The roof for an electric arc furnace, according to the invention, is characterized by a frame made of hollow cooled elements in the form of a grid or lattice exerting a cooling action thereupon and supporting the blocks of fire proof material.

The roof according to the invention is further characterized by the fact that the interior of the elements of the frame or lattice is connected with a tank of cooling water, advantageously with the tank of cooling water for the electrode flame shield. The roof according to the invention is further characterized by the fact that the spaces between two adjacent hollow cooling elements of the frame or lattice are of smaller dimensions at the bottom than at the top.

The roof is further characterized by the fact that the spaces between the adjacent hollow cooling elements are filled with fire proof elements of low quality and low price, such elements being simply mounted. The said elements may be preformed and are therefore of standard dimensions so that they may be replaced during the operation of the furnace if necessary.

The invention is shown by way of example in the annexed drawing in which:

Fig. 1 shows a vertical section of an electric furnace roof in accordance with the invention, the section being taken along the broken line I—I of Fig. 2, but with certain piping omitted.

Fig. 2 shows a diagrammatic plan view, with portions broken away to show the construction underneath.

Fig. 3 is an enlargement of a portion of Fig. 1.

Fig. 4 shows diagrammatically a supply of cooling water for the furnace roof.

As herein shown, the roof has an external frame 1 supporting a plurality of hollow elements 2, 3, 4, 5, 6, 7, 8 disposed parallel to one another and of trapezoidal cross section with the larger bases at the bottom so that the space between the upper edges 9, 10 of two adjacent hollow elements is greater than the corresponding distance between the edges of the same elements at their bottom edges. Three of said hollow elements, namely elements 4, 5, 6, are disposed in such a way that their longitudinal center lines pass through the axes 11, 12 and 13 of the electrodes and are provided with annular chambers 23 through which the electrodes are adapted to pass. Outside of the frame 1, there is a circumferentially extending conduit 14 connected with one end of each of hollow elements 2 to 8 by means of conduits 15 provided with control valves 16. The other ends of the elements 2 to 8 are connected, by means of conduits 17, to a circumferentially extending collecting conduit 18 preferably disposed higher than the conduit 14. The supply conduit 14 is connected to a tank 20 of cooling water by conduits 21 and 21' (Fig. 4), the flow of water being controlled by a suitable valve 19. The tank 20 is suitably supported as by girders 31. The collecting conduit 18 is likewise connected to the tank 20 by conduits 22 and 22' to return the discharged water to the tank for cooling and recirculation. The return flow of water is preferably controlled by a valve 30 in conduit 22'. The cooling water tank 20 may advantageously be the same tank that, through suitable connections, supplies cooling water to the customary flame shield 32 around the electrodes.

The annular chambers 23 provided in hollow elements 4, 5 and 6 to receive the electrodes have an internal diameter larger than the electrodes to provide annular spaces around the electrodes. These annular spaces are closed at the top by circular fire bricks 24 (Fig. 3) shaped in such manner as to prevent any contact of the electrodes with the annular chambers 23.

The spaces between the hollow cooling elements of the lattice constructed in this way are filled with fire proof material 25, 26, 27. This fire proof material may be formed with clay-work or with pre-formed blocks and in the latter case, care will be taken to have the blocks to be used of the same dimensions, so that they may eventually be replaced during the operation of the furnace as noted above. The fire proof material may, in any event, be of low quality and low cost as the cooling process prevents the reaching of a high temperature.

The operation of the roof constructed as above described is as follows: By proper and convenient opening of the valves or the cocks 16, 19 and 31, the desired flow of the cooling water is provided in the different hollow elements 2 to 8 and 23. During the operation of the device, the heat of the furnace tends to increase the temperature of the frame and of the fire proof material interposed between its elements. The running water provides the necessary removal of heat, and the roof will remain at low temperature, thus avoiding the undesirable effects noted above.

While, for purposes of illustration, the present invention is shown and described as a roof for a metallurgical furnace with electrodes, it should be understood that the said invention may be applied to any other industrial furnace in which the roof does not exert a reverberatory action and in which it is desired to extend the life of the device and provide economy of manufacture and maintenance.

What I claim is:

1. In a roof for an electric furnace, a circular frame, a plurality of cooling conduits extending across said frame, said conduits being straight and parallel to one another and spaced equal distances apart from one another, said conduits being of trapezoidal cross section with the larger bases at the bottom and at approximately the same level, means for supplying a cooling medium to said conduits, segments of refractory material disposed between and supported by said conduits and other segments of ceramic material disposed between and supported by the outermost conduits and the frame.

2. In a roof for an electric furnace a circular frame, a plurality of cooling conduits extending across said frame, said conduits being straight and parallel to one another and spaced equal distances apart from one another, said conduits being of trapezoidal cross section with the larger bases at the bottom and at approximately the same level, means for supplying a cooling medium to one end of each conduit, means for discharging said cooling medium from the opposite end of each conduit, means for individually regulating the flow of cooling mediums through each conduit and segments of refractory material disposed between and supported by said conduits and the frame.

3. An electric furnace roof structure according to claim 2, in which the discharge is from the upper portion of each conduit.

4. In a roof for an electric furnace, a circular frame, a plurality of cooling conduits extending across said frame, said conduits being straight and parallel to one another and spaced apart equal distances from one another, said conduits being of trapezoidal cross section with the larger bases at the bottom and at approximately the same level, means for supplying a cooling medium to said conduits, a plurality of like blocks of refractory material disposed between and supported by said conduits, said blocks being rectangular and of trapezoidal cross section with the larger bases up and other blocks of refractory material disposed between and supported by conduits and the frame, said other blocks having a straight side and a curved side.

5. In a roof for an electric furnace having electrodes, a circular frame, a plurality of cooling conduits extending across said frame, said conduits being straight and parallel to one another and spaced equal distances apart from one another, certain of said conduits being provided with annular chambers forming openings through which the electrodes are adapted to pass and being disposed so that their longitudinal axes pass through said openings, said conduits being of trapezoidal cross section with the larger bases at the bottom and at approximately the same level, means for supplying a cooling medium to said conduits and segments of refractory material disposed between and supported by said conduits and frame.

References Cited in the file of this patent

UNITED STATES PATENTS

| Number | Name | Date |
|---|---|---|
| 387,419 | Jordan | Aug. 7, 1888 |
| 699,654 | DeChalmot | May 13, 1902 |
| 1,582,275 | Kellner | Apr. 27, 1926 |
| 1,583,009 | Reille | May 4, 1926 |
| 1,666,659 | Ladd | Apr. 17, 1928 |
| 1,861,213 | Greene | May 31, 1932 |
| 1,922,312 | Mansfield | Aug. 15, 1933 |
| 1,992,465 | Blagg | Feb. 26, 1935 |
| 2,222,004 | Smith | Nov. 19, 1940 |
| 2,512,439 | Richards | June 20, 1950 |
| 2,551,941 | Greene | May 8, 1951 |

FOREIGN PATENTS

| Number | Country | Date |
|---|---|---|
| 199,198 | Germany | Jan. 9, 1808 |